US006949845B2

(12) United States Patent
Oisugi et al.

(10) Patent No.: US 6,949,845 B2

(45) Date of Patent: Sep. 27, 2005

(54) PLANAR MOTOR

(75) Inventors: Yutaka Oisugi, Chiba-Ken (JP); Hideaki Sato, Chiba-Ken (JP)

(73) Assignee: Chiba Precision Co., Ltd., Chiba-ken (JP)

( * ) Notice: Subject to any disclaimer, the term of this patent is extended or adjusted under 35 U.S.C. 154(b) by 0 days.

(21) Appl. No.: 10/882,258

(22) Filed: Jul. 2, 2004

(65) Prior Publication Data

US 2005/0116548 A1 Jun. 2, 2005

(30) Foreign Application Priority Data

Dec. 2, 2003 (JP) ....................................... 2003-402676

(51) Int. Cl.[7] ................................................ H02K 41/02

(52) U.S. Cl. .............................. 310/12; 310/13; 310/15

(58) Field of Search .............................. 319/12; 310/13, 310/15; 414/935, 936; H02K 41/02

(56) References Cited

U.S. PATENT DOCUMENTS 6,144,118 A * 11/2000 Cahill et al. .................. 310/12
6,339,266 B1 * 1/2002 Tanaka ........................ 310/12

FOREIGN PATENT DOCUMENTS

JP 05-022924 1/1993
JP 10-075562 3/1998

* cited by examiner

*Primary Examiner*—Darren Schuberg
*Assistant Examiner*—Iraj A. Mohandesi
(74) *Attorney, Agent, or Firm*—Venable LLP; Michael A. Sartori

(57) ABSTRACT

A planar motor permits a thinner design, controlled vibration, and highly accurate positioning by disposing X-axis and Y-axis coreless type linear motors on the same plane without using an expensive linear guide and by incorporating high-accuracy capacitance displacement sensors in X and Y directions. Two pairs of permanent magnets are disposed such that they are respectively orthogonalized with respect to two axes that are orthogonalized with each other on a movable stage and that they generate magnetic fluxes in a direction perpendicular to a surface of the movable stage. Furthermore, the permanent magnets of one pair are disposed symmetrically to each other about one of the two axes, while those of the other pair are disposed symmetrically to each other about the other axis. Two pairs of coils are provided such that they oppose and match the two pairs of permanent magnets. A cross-shaped common electrode is installed to the movable stage and disposed such that it opposes a fixed electrode composed of two electrodes disposed on a fixed electrode base. Displacements of the movable stage can be determined from changes in capacitance of capacitors formed by the cross-shaped common electrode and the fixed electrodes.

3 Claims, 6 Drawing Sheets

PLANAR MOTOR

BACKGROUND OF THE INVENTION

1. Field of the Invention

The present invention relates to a planar motor used for performing fine positional control of a stage of a microscope or the like.

2. Description of the Related Art

Hitherto, as a device adapted to position an object two-dimensionally in X-axis and Y-axis directions, an X-Y stage is widely known. The X-Y stage is constructed of a stage that includes ball screws and servo motors installed in a linear guide and extends in one direction, and another stage stacked in the direction orthogonal with respect to the above stage.

Another well-known planar motor has a X-axis drive linear motor and a Y-axis drive linear motor of variable reluctance type pulse motors that are disposed on the same plane, as disclosed in Japanese Unexamined Patent Application Publication No. H10-75562. Still another well-known planar motor has a biaxial linear motor and a plurality of laser interferometers used as position detectors for accomplishing highly accurate positioning in three directions of the plane, as disclosed in Japanese Patent Application No. H3-172326.

The first planar motor described above has the stack construction, making it difficult to reduce its thickness. Furthermore, the planar motor requires more mechanical components, which adversely affects responsiveness and accuracy due to lost motion from backlashes or stage weight.

The second planar motor is basically composed of pulse motors, so that it cannot be controlled in case of step-out. Furthermore, vibration during operation cannot be eliminated even if an ingenious control means is adopted.

The third planar motor requires an expensive peripheral device for positional detection and involves difficult alignment at installation.

SUMMARY OF THE INVENTION

Accordingly, it is an object of the present invention to provide a planar motor that permits a thinner design, controlled vibration, and highly accurate positioning by disposing X-axis and Y-axis coreless type linear motors on the same plane without using an expensive linear guide and by incorporating high-accuracy capacitance displacement sensors in X and Y directions.

To this end, the present invention provides a planar motor formed of a planar X-Y drive motor including a movable stage having two pairs of S/N permanent magnets producing magnetic fluxes in a perpendicular direction with respect to a surface of the movable stage, the permanent magnets of one pair being positioned such that they are orthogonalized with respect to one axis of two axes orthogonalized to each other on a plane of the movable stage and also equidistantly apart from the other axis, a fixed stage having coils that oppose the permanent magnets, each coil being driven to move the movable stage in the planar direction of the fixed stage, a cross-shaped common electrode disposed such that it moves together with the movable stage on a plane, and a plurality of fixed electrodes having a gap with respect to the cross-shaped common electrode, each being composed of a pair of electrodes disposed to correspond to each electrode end portion of the cross-shaped common electrode, wherein capacitances of two capacitors, each of which is formed of the pair of fixed electrodes opposing the cross-shaped common electrode, remain unchanged in response to a motion in an axial direction in which the capacitors are oriented, while they exhibits differential changes in response to a motion in the other axial direction such that one of them increases and the other decreases in proportion to a displacement resulting from a displacement.

Preferably, the planar motor further includes a part or entire comparative arithmetic circuit for calculating displacements in X, Y and θ directions from capacitances of all capacitors constructed among the cross-shaped common electrode and the fixed electrodes, wherein position control in the X, Y and θ directions is carried out on the basis of the displacements output from the comparative arithmetic circuit.

Preferably, the planar motor further includes a part or entire comparative arithmetic circuit for calculating displacements in X and Y directions from capacitances of four sets of capacitors constructed among the cross-shaped common electrode and the fixed electrodes, wherein position control in the X and Y directions of a plane is carried out on the basis of the displacements output from the comparative arithmetic circuit.

According to the above arrangements, two linear motors and two displacement sensors are provided in each of the two directions of the plane. Hence, control can be carried out such that, when attention is focused on either the X-axis or the Y-axis, the displacement of the other axis is always zero. In other words, the function of a guide can be provided by engaging servo lock at a predetermined position, so that the motor can be used also as a one-dimensional linear motor without using an expensive linear guide.

Moreover, outputs from the comparative arithmetic circuit permits precise control in respective directions of a plane.

DESCRIPTION OF THE PREFERRED EMBODIMENTS

An embodiment of the present invention will now be explained in detail with reference to the accompanying drawings.

Figure 1:
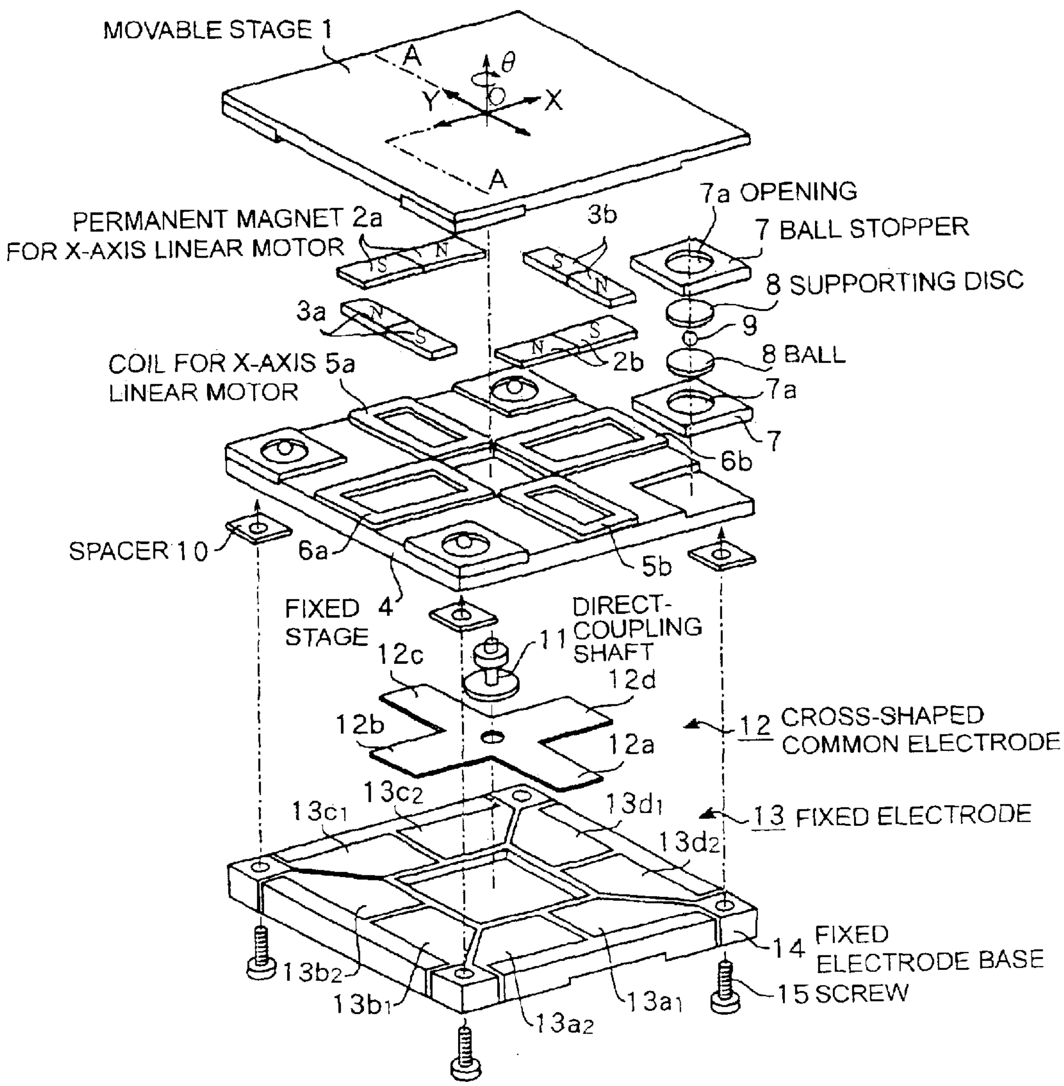
FIG. 1 is an exploded perspective view showing an embodiment of a planar motor in accordance with the present invention.

FIG. 1 is an exploded perspective view showing the embodiment of a planar motor in accordance with the present invention.

This embodiment is an example of a movable magnet type planar motor formed of permanent magnets and coils. A planar motor is basically constructed of an X-axis linear motor structure and a Y-axis linear motor structure disposed to be geometrically orthogonal with respect to the X-axis linear motor structure, these two linear motors being installed on the same plane.

The X-axis linear motor structure has a pair of permanent magnets 2*a* and 2*b* mounted on the bottom surface of a movable stage 1 made of a ferromagnetic member, and planar coils 5*a* and 5*b* made of a ferromagnetic member and disposed on the top surface of a fixed stage 4. The planar coils 5*a* and 5*b* are interlinked with magnetic fluxes of the permanent magnets 2*a* and 2*b*.

The Y-axis linear motor structure has a pair of permanent magnets 3*a* and 3*b* mounted on the bottom surface of the movable stage 1, and planar coils 6*a* and 6*b* disposed on the top surface of the fixed stage 4. The planar coils 6*a* and 6*b* are interlinked with magnetic fluxes of the permanent magnets 3*a* and 3*b*.

The permanent magnets 2*a* and 2*b* are disposed such that their longitudinal directions (S/N polarity directions) correspond to the X-axis direction and they are orthogonal with respect to the Y-axis and symmetrical to each other about the X-axis.

Similarly, the permanent magnets 3*a* and 3*b* are disposed such that their longitudinal directions (S/N polarity directions) correspond to the Y-axis direction and they are orthogonal with respect to the X-axis and symmetrical to each other about the Y-axis.

Figure 3A:
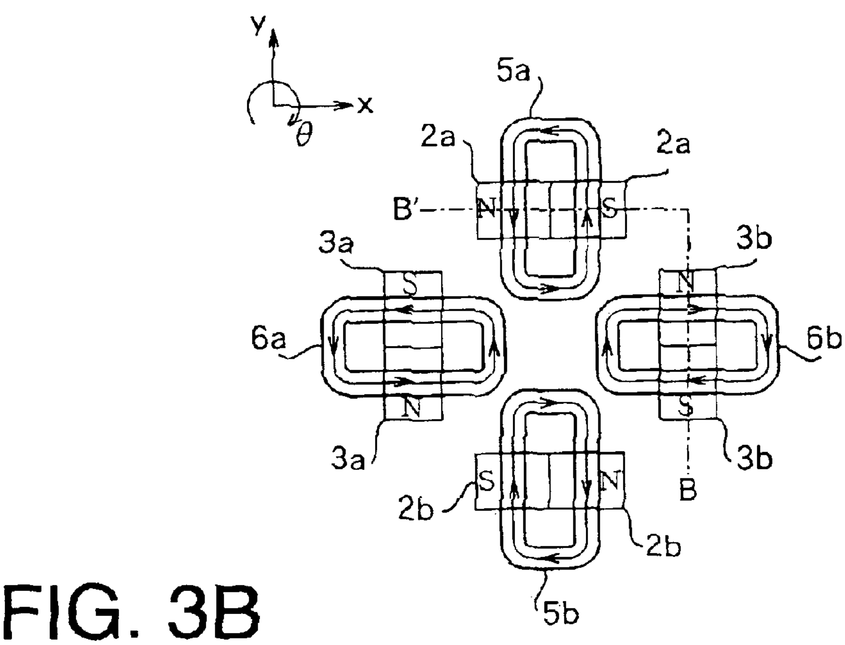
FIGS. 3A and 3B are diagrams for explaining dispositional relationships among X-axis and Y-axis coils and permanent magnets.
Figure 3B:
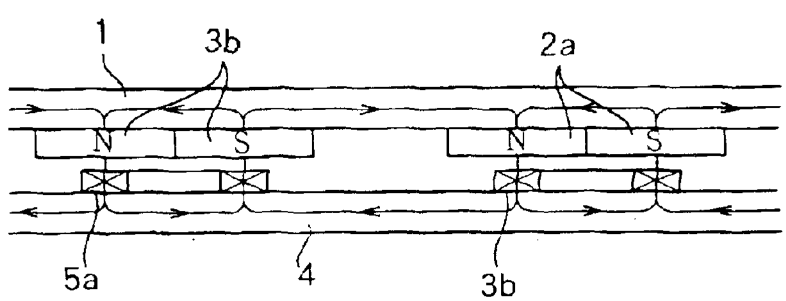

FIGS. 3A and 3B show a positional relationship among the permanent magnets 2*a*, 2*b*, 3*a* and 3*b*, and the planar coils 5*a*, 5*b*, 6*a*, and 6*b*.

The planar coils are rectangular, as observed from above, and formed to be thin. The planar coils are disposed such that their longitudinal directions are orthogonalized with the longitudinal directions (S/N polarity directions) of the permanent magnets, and that the magnetic fluxes of the permanent magnets penetrate the surfaces of the planar coils.

Ball stoppers 7, each having an opening 7*a* at the center thereof, are fixed at the four corners of the bottom surface of the movable stage 1. The supporting discs 8 made of a hard material are installed in the openings 7*a*.

Similarly, the ball stoppers 7, each having a opening 7*a* at the center thereof, are fixed at the four corners of the top surface of the fixed stage 4. The supporting discs 8 made of a hard material are installed in the openings 7*a*.

Balls 9 are placed in the openings 7*a* of the ball stoppers 7 at the four corners of the fixed stage 4, and then the movable stage 1 is mounted. This causes the two stages 1 and 4 to be drawn to each other due to the attraction force produced between the permanent magnets 2*a*, 2*b*, 3*a*, and 3*b* and the fixed stage 4. At this time, the presence of the balls 7 provides a predetermined gap between the two stages 1 and 4, while the movable stage 1 is free to move within a defined range on the fixed stage 4 at the same time.

One end of a direct-coupling shaft 11 is secured to the center of the bottom surface of the movable stage 1. A cross-shaped common electrode 12 is attached to the other end of the direct-coupling shaft 11 such that the cross-shaped common electrode 12 and the movable stage are aligned at their centers and that they are electrically isolated. A fixed electrode base 14 has eight fixed electrodes $13a_1$, $13a_2$ to $13d_1$, $13d_2$ that are arranged such that they oppose the cross-shaped common electrode 12 of the movable stage 1 in parallel with a predetermined gap provided therebetween. Furthermore, a total of four sets of capacitors, i.e., a total of eight capacitors (each set consisting of two capacitors), is formed between electrode tips 12*a*, 12*b*, 12*c*, and 12*d* of the cross-shaped common electrode 12 and the fixed electrodes $13a_1$ and $13a_2$, $13b_1$ and $13b_2$, $13c_1$ and $13c_2$, and $13d_1$ and $13d_2$. The capacitance of each capacitor changes whenever the cross-shaped common electrode 12 is displaced, thus achieving capacitance sensors.

Figure 2:
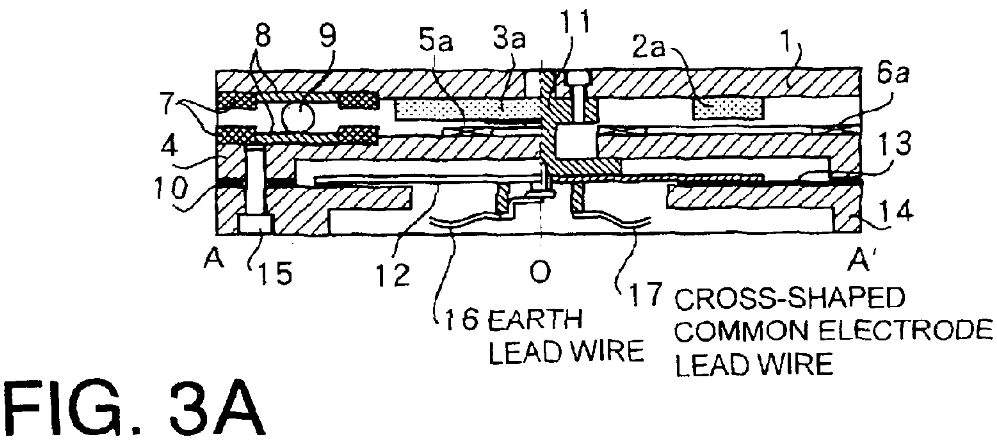
FIG. 2 is a sectional view taken along line A'-O-A of the planar motor in accordance with the present invention.

FIG. 2 is a sectional view taken along line A'-O-A of the planar motor constructed of the components shown in FIG. 1.

The fixed stage 4 has an opening at its center for the direct-coupling shaft 11 to pass therethrough and to assure unimpeded motion of the movable stage 1 in its movable range. The fixed stage 4 also has internal threads formed at the four corners of the bottom surface thereof. The four corners of the fixed electrode base 14 has through holes in which screws 15 are inserted to be screwed into the internal threads through the intermediary of spacers 10. This installs the fixed stage 4 to the fixed electrode base 14.

A lead wire 17 and an earth lead wire 16 of the cross-shaped common electrode 12 are drawn out of the bottom surface of the fixed electrode base 14. Lead wires for exciting the coils and lead wires of the fixed electrodes are not shown.

Figure 4A:
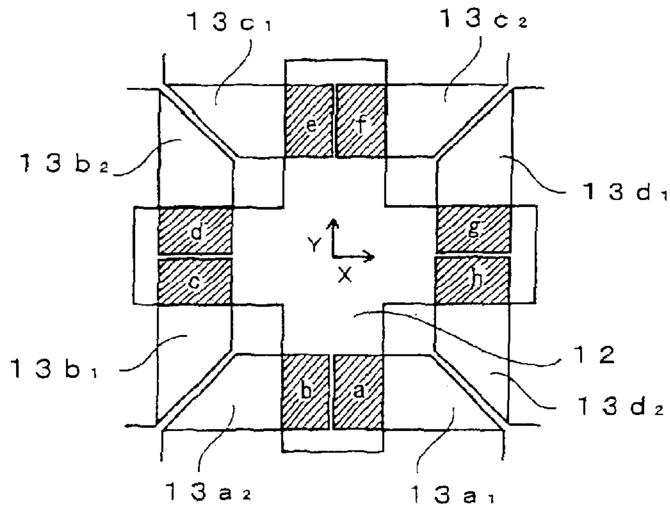
FIGS. 4A to 4C are two-dimensional diagrams illustrating layout relationship among electrodes of a capacitance sensor.
Figure 4B:
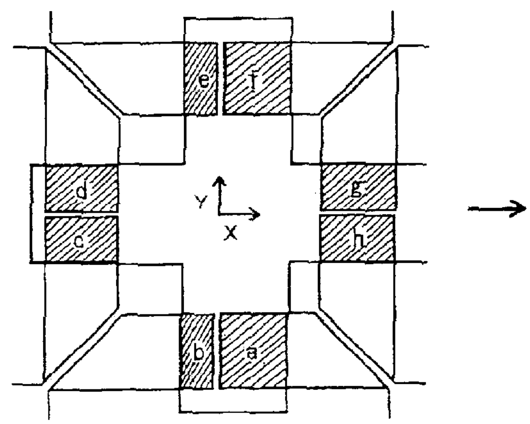
Figure 4C:
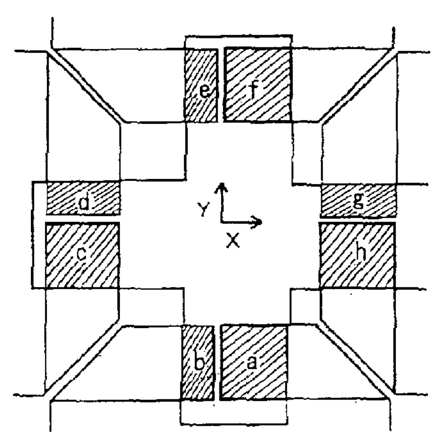

FIGS. 4A, 4B, and 4C are two-dimensional diagrams showing a layout relationship of the electrodes of the capacitance sensors.

The hatched portions shown in the diagrams denote the areas wherein the cross-shaped common electrode 12 overlaps the fixed electrodes $13a_1$, $13a_2$, through $13d_1$, $13d_2$. The sizes of the areas are in proportion to the capacitances of the capacitors formed by the electrodes.

FIG. 4A shows a case where the movable stage 1 is at a zero reference position of the X-axis and the Y-axis, and the capacitances of the eight capacitors are all equal.

FIG. 4B illustrates a positional relationship of the sensors when the movable stage 1 moves from the zero reference position in a positive X-axis direction. Two sets of fixed electrodes $13a_1$, $13a_2$ and $13c_1$, $13c_2$ arranged in the X-axis direction exhibit differential changes. More specifically, a capacitance corresponding to one set of the electrodes $13a_1$ and $13c_2$ increases, while a capacitance corresponding to the other set of the electrodes $13a_2$ and $13c_1$ decreases. At this time, the capacitances of the two sets of the fixed electrodes $13b_1$, $13b_2$ and $13d_1$, $13d_2$ arranged in the Y-axis direction remain unchanged.

FIG. 4C illustrates a positional relationship of the sensors when the movable stage 1 moves from the position shown in FIG. 4B in the Y-axis direction. In this case, the capacitances corresponding to the two sets of fixed electrodes $13a_1$, $13a_2$ and $13c_1$, $13c_2$ arranged in the X-axis direction remain unchanged, while the capacitances corresponding to the fixed electrodes $13b_1$, $13b_2$ and $13d_1$, $13d_2$ arranged in the Y-axis direction differentially change.

Figure 5A:
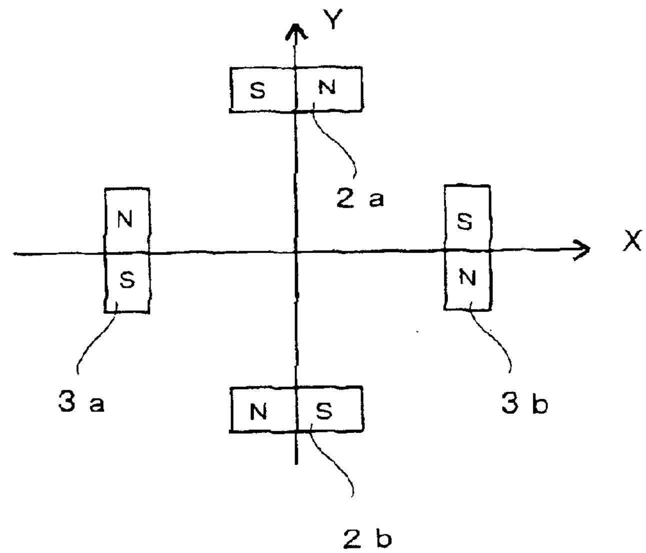
FIGS. 5A and 5B are diagrams for explaining another embodiment of the layout of permanent magnets.
Figure 5B:
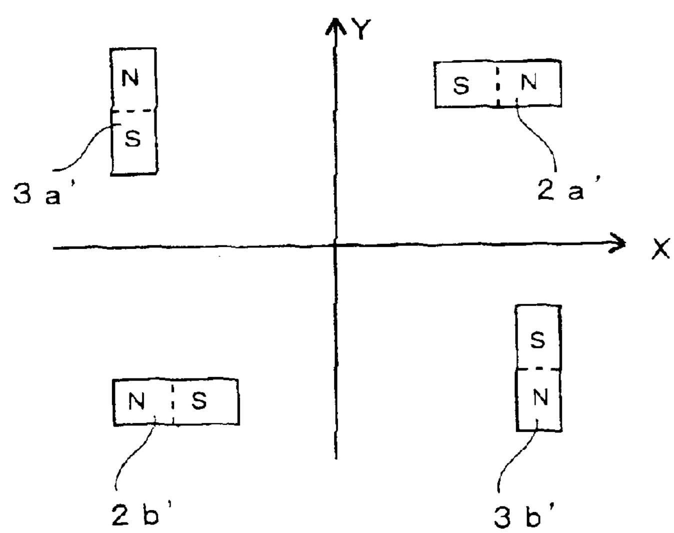

FIGS. 5A and 5B are diagrams for explaining another embodiment having a different layout of permanent magnets.

FIG. 5A shows a layout example of permanent magnets of the embodiment shown in FIG. 1. FIG. 5B shows another layout example in which permanent magnets 3*a*' and 3*b*' are equidistantly located from the Y-axis and vertically shifted in the X-axis direction. Similarly, permanent magnets 2*a*' and 2*b*' are equidistantly located from the X-axis and vertically shifted in the Y-axis direction. This layout also allows a planar motor providing similar advantages to be achieved.

Figure 6A:
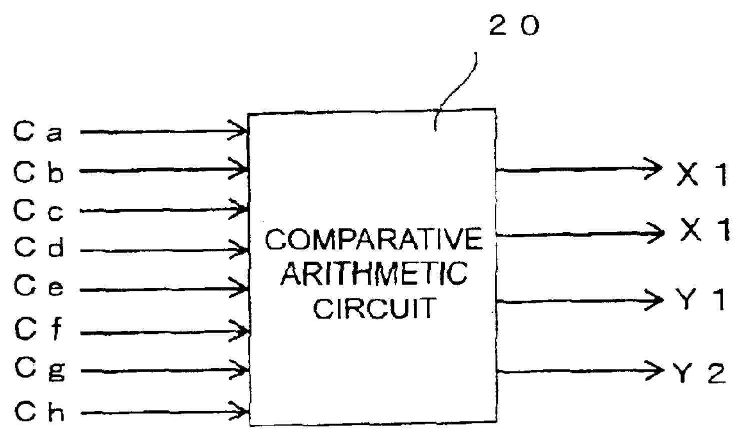
FIGS. 6A and 6B are diagrams for explaining an operation of a comparative arithmetic circuit.
Figure 6B:
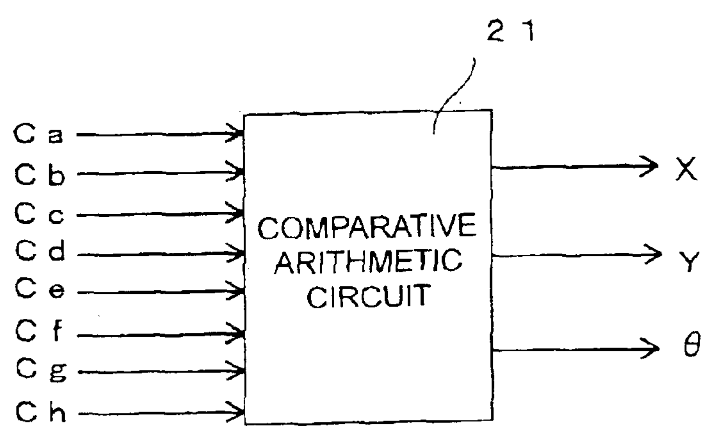

FIGS. 6A and 6B are block diagrams showing an embodiment of a comparative arithmetic circuit for receiving outputs from the electrodes to determine movements of the plane in responses to changes in capacitances.

A comparative arithmetic circuit 20 shown in FIG. 6A calculates the amounts of displacements of the X-axis and the Y-axis according to expressions (1) to (4) given below on the basis of outputs of the differential four sets of capacitors Ca to Ch (eight capacitors). This comparative arithmetic circuit uses an arithmetic expression disclosed in Japanese Patent Application No. 2003-309072. According to the arithmetic expression, the amount of changes in the capacitances of the set of capacitors Ca and Cb that differentially operate can be determined as DC voltage detections signals by $V_0$=(Ca−Cb)/(Ca+Cb).

$$X1=(Cb-Ca)/(Ca+Cb+Cc+Cd+Ce+Cf+Cg+Ch) \quad (1)$$

$$X2=(Ce-Cf)/(Ca+Cb+Cc+Cd+Ce+Cf+Cg+Ch) \quad (2)$$

$$Y1=(Cc-Cd)/(Ca+Cb+Cc+Cd+Ce+Cf+Cg+Ch) \quad (3)$$

$$Y2=(Ch-Cg)/(Ca+Cb+Cc+Cd+Ce+Cf+Cg+Ch) \quad (4)$$

Turning the amount of displacement of each set of the sensors determined by the above comparative calculation into feedback signals makes it possible to independently control the position of each linear motor (each of the four linear motor structures) oriented perpendicularly on the plane with respect to each set of sensors (each of the four sets of capacitance sensors).

A comparative arithmetic circuit 21 shown in FIG. 6B performs calculations according to expressions (5) to (7) using outputs of the eight capacitors Ca to Ch, which differentially operate, so as to calculate displacements in the X-axis direction, the Y-axis direction, and about axis θ in the direction perpendicular to the plane. In this case, feedback signals for centralized control based on coordinate conversion rather than independent control are used to improve control performance. As compared with the independent control, the centralized control allows interference of each axis to be corrected, so that position control performance of the planar motor can be further improved.

Figure 7A:
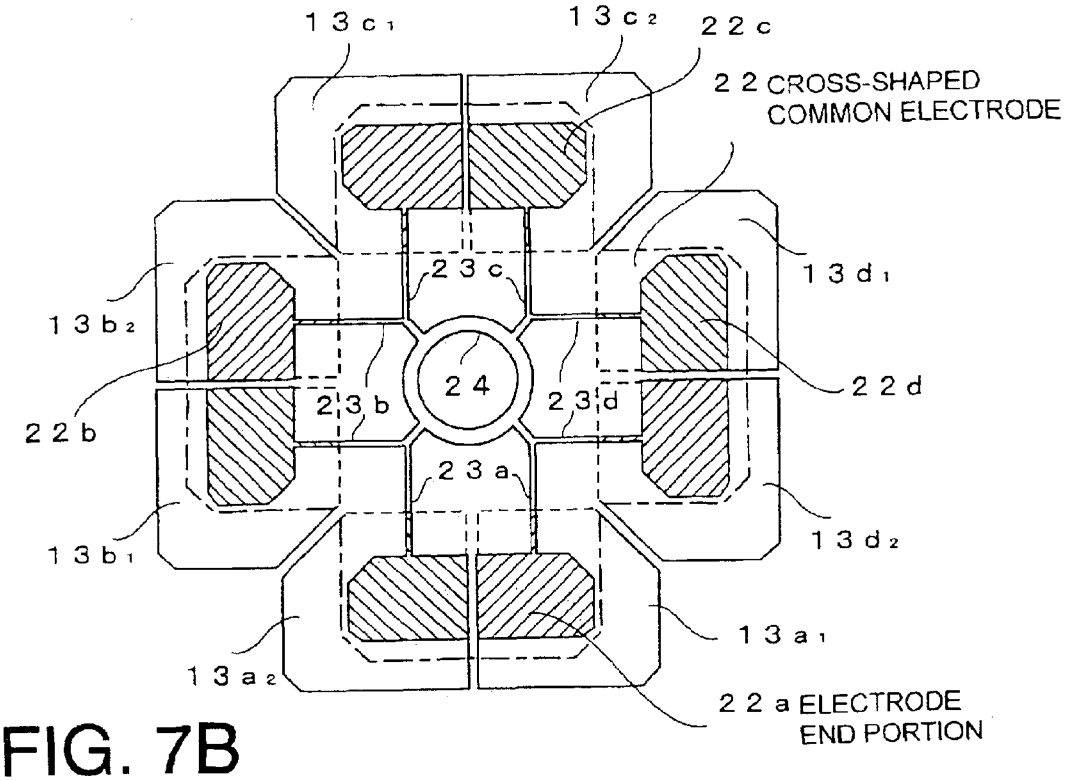
FIGS. 7A and 7B are diagrams for explaining another embodiment of a cross-shaped common electrode of the planar motor in accordance with the present invention.
Figure 7B:
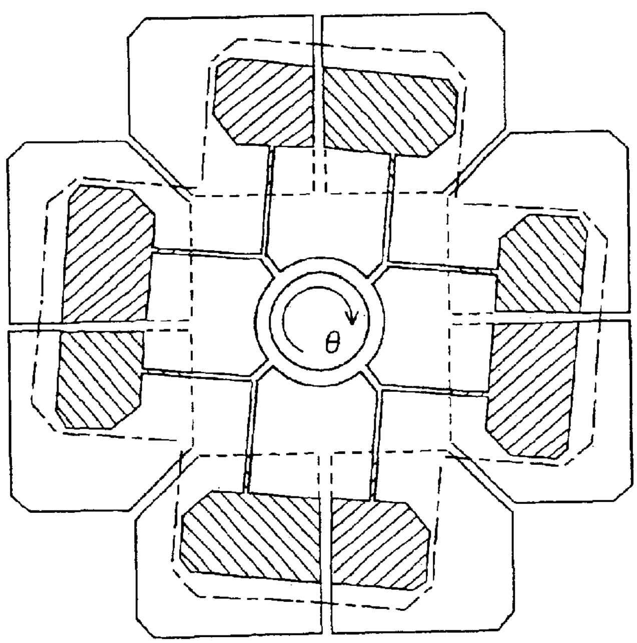

FIGS. 7A and 7B illustrate an embodiment of a cross-shaped common electrode to which the comparative arithmetic circuit 21 shown in FIG. 6B applies.

Referring to FIGS. 7A and 7B, a cross-shaped common electrode 22 is constructed of a cross-shaped substrate, island-shaped electrode end portions 22*a* through 22*d* formed at end portions of the cross-shaped substrate, an annular pattern 24 provided at the center of the substrate, and linear patterns 23*a* through 23*d* that connect the electrode end portions 22*a* through 22*d* and the annular pattern 24.

The electrode end portions 22*a* through 22*d* of the cross-shaped common electrode 22 are formed like islands, so that, as shown in FIG. 7A, the areas of the portions thereof (hatched portions) that overlap the fixed electrodes $\mathbf{13}a_1$, $\mathbf{13}a_2$ through $\mathbf{13}d_1$, and $\mathbf{13}d_2$ remain unchanged when the movable stage is moved in the X-axis or Y-axis direction or circularly moved. Therefore, the total of the capacitances of the eight capacitors (the value of the denominator in expression (7)) can be maintained to a fixed value, making it possible to perform comparative calculation by the arithmetic circuit shown in FIG. 6B.

$$X1=X1+X2 \quad (5)$$

$$Y1=Y1+Y2 \quad (6)$$

$$\theta=[(Cb+Cd+Cf+Ch)-(Ca+Cc+Ce+Cg)]/(Ca+Cb+Cc+Cd+Ce+Cf+Cg+Ch) \quad (7)$$

In the above embodiments, the linear motors are provided on the upper side, while the sensors are provided under the linear motors; however, the positional relationship between the linear motors and the sensors is not limited thereto. For instance, sensors may be disposed near centers of linear motors or the sensors may be disposed beside the linear motors.

The balls have been used as the means for supporting the movable stage on the fixed stage such that it may move in plane. As an alternative supporting means, an air-cushion or magnetic levitation means may be used to permit the planar movement. In this case, the attraction force produced by magnets, as in the aforesaid embodiments, will be unnecessary, so that the magnetic circuit section provided by the fixed stage in the embodiments may be provided on the movable stage.

Furthermore, the descriptions have been given of the examples of the planar X-Y axis drive motor having the permanent magnets mounted on the movable stage and the coils on the fixed stage. However, similar advantages can be obtained also in a case where the coils are mounted on the movable stage and the permanent magnets are mounted on the fixed stage. This example also falls within the scope of the present invention.

What is claimed is:

1. A planar motor formed of a planar X-Y drive motor comprising:

a movable stage having two pairs of S/N permanent magnets producing magnetic fluxes in a perpendicular direction with respect to a surface of the movable stage, the permanent magnets of one pair being positioned such that they are orthogonalized with respect to one axis of two axes orthogonalized to each other on a plane of the movable stage and also equidistantly apart from the other axis;

a fixed stage having coils that oppose the permanent magnets, each coil being driven to move the movable stage in the planar direction of the fixed stage;

a cross-shaped common electrode disposed such that it moves together with the movable stage on a plane; and a plurality of fixed electrodes having a gap with respect to the cross-shaped common electrode, each being composed of a pair of electrodes disposed to correspond to each electrode end portion of the cross-shaped common electrode, wherein capacitances of two capacitors, each of which is formed of the pair of fixed electrodes opposing the cross-shaped common electrode, remain unchanged in response to a motion in an axial direction in which the capacitors are oriented, while they exhibits differential changes in response to a motion in the other axial direction such that one of them increases and the other decreases in proportion to a displacement resulting from a displacement.

2. The planar motor according to claim 1, further comprising a part or entire comparative arithmetic circuit for calculating displacements in X, Y and θ directions from capacitances of all capacitors formed between the cross-shaped common electrode and the fixed electrodes, wherein position control in the X, Y and θ directions is carried out on the basis of displacements output from the comparative arithmetic circuit.

3. The planar motor according to claim 1, further comprising a part or entire comparative arithmetic circuit for calculating displacements in X and Y directions on the basis of capacitances of all capacitors formed between the cross-shaped common electrode and the fixed electrodes, wherein position control in the X and Y directions is carried out on the basis of the displacements output from the comparative arithmetic circuit.

* * * * *